US005396594A

United States Patent [19]

Griffith et al.

[11] Patent Number: 5,396,594

[45] Date of Patent: Mar. 7, 1995

[54] COMPUTER TO COMBINE IMAGES BY VIDEO TREATMENT

[75] Inventors: Gareth H. Griffith; Christopher Steele, both of London, England

[73] Assignee: 3 Space Software Limited, United Kingdom

[21] Appl. No.: 871,170

[22] Filed: Apr. 20, 1992

[30] Foreign Application Priority Data

Apr. 19, 1991 [GB] United Kingdom ................ 9108389

[51] Int. Cl.⁶ ............................................ G06F 15/62

[52] U.S. Cl. .................................... 395/164; 358/452

[58] Field of Search .............. 395/105, 122, 147, 148, 395/155, 162, 164; 360/13; 361/83; 358/311, 452, 22; 340/723, 724, 755, 703; 345/112, 113, 133, 150, 185, 202

[56] References Cited

U.S. PATENT DOCUMENTS 4,357,624 11/1982 Greenberg ............................ 358/22
4,463,372 7/1984 Bennett et al. ........................ 358/22
4,514,818 4/1985 Walker ................................ 340/703
4,954,912 9/1990 MacDonald et al. ............... 358/452
5,150,311 9/1992 Long et al. .......................... 395/108

*Primary Examiner*—Mark R. Powell
*Assistant Examiner*—Kee M. Tung
*Attorney, Agent, or Firm*—Larson and Taylor

[57] ABSTRACT

A computer is used to combine images by video treatment and to display the resultant image. Rather than use a frame store for storing each component image to be treated, the computer is used for storing the component images and only a single frame store is used for storing the resultant image ready for display, with a consequent saving of hardware. The image in the frame store can be refreshed either as a whole or only in the parts which have recently been edited. The images to be combined can be ordinary images or control images, the control applying control functions (such as blurring) to the image with which it is being combined.

6 Claims, 6 Drawing Sheets

COMPUTER TO COMBINE IMAGES BY VIDEO TREATMENT

BACKGROUND OF THE INVENTION

A video image is constructed from a rectangular array of coloured dots. On a raster display device, each dot consists of a red, a green and a blue phosphor and the relative brightness of these three phosphors (colour components) determines the colour perceived by the viewer. In a standard graphics computer, the information comprising the video image is stored in a framestore. This is a segment of random access dual ported memory in which the colour of each dot in the video image is represented by one or more numbers. Each dot is known as a picture element or pixel. Several formats exist for encoding the picture colour information, the most common one being the Red Green Blue format (RGB) whereby one number per pixel is used to represent the brightness of each of the red, green and blue colour components. In existing systems, the image is then displayed by scanning the contents of the framestore with a direct video readout and lighting the screen phosphors accordingly.

The original images which are to be treated may be a video image itself or it may be derived from an analogue form such as photographic film, graphics or a conventional form of artistic representation. It may contain any number of pixels in both horizontal and vertical dimensions.

Usually, each component in the framestore is represented at each pixel by a value ranging from 0 to 255:0 corresponding to darkness and 255 to full brightness for that component. The number is representable in computer memory by one byte of information (8 binary bits). Hence a full colour image comprising red, green and blue components requires storage of 3 bytes (24 bits) per pixel. This is the familiar 24 bit framestore. The invention is applicable to images and framestores of any size. 8 bits and 24 bits are only quoted as examples.

It is known for a video image to be overlaid on a second video image by supplementing the 6 values corresponding to the 3 colour components of the two images with a further value, also ranging from 0 to 255, representing the alpha value. This value (sometimes known as the mask, stencil or blend value) governs the extent to which the overlying image replaces by its own colour values the colour values of the corresponding point of the image below. If it is desired that the alpha value is displayed superimposed over the image itself, a 32 bit framestore is required rather than a 24 bit framestore.

If a combined image comprises 2 layers then the arrangements of the prior art require further specialist hardware in the form of at least 2 24 bit framestores and a further store for the alpha value of each pixel. If the image comprises more than 2 layers, it follows that an additional framestore would be required for each additional layer. Such use of multiple framestores for multilayered images is both complex and expensive in terms of hardware requirements. It is also only possible to edit one layer of the image at a time.

SUMMARY OF THE INVENTION

It is the object of this invention to overcome these disadvantages of the prior art by creating, displaying and editing a multiple layered image in such a way as to allow independent or interdependent editing of layers either individually or simultaneously and to supply a single combined image to a single framestore which then feeds the display.

There is therefore provided a method of operating a computer having a single framestore, a data input device and a display device under the control of the framestore, the method comprising receiving a plurality of component images and storing these component images separately within the computer memory, editing and combining the component images using a selected combining function and supplying the combined image to the framestore for display by the display device. There is only one framestore because the individual images are combined in the computer before the framestore is reached. The framestore need only be a 24-bit framestore, or it may be smaller, e.g., an 8-bit framestore, or even smaller still, if the composite image is compressed by the computer or a device between the computer output and the framestore. An 8-bit image may be formed by allocating 3 bits to the most significant Red and Green values and 2 bits to the most significant part of the Blue value (the eye being least sensitive to blue).

Since a framestore limits the size of the image which can be stored therein by virtue of its own physical size, it is an advantage to store the component images in the computer memory as is done in the present invention, leaving the single framestore for use in the display of the composite image, compressed if necessary. The computer memory is cheaper than a framestore to provide the same memory capacity.

The composite image could also be modified, for example by applying a known 3-D transformation so that it appears in perspective.

The composite image in the framestore can be refreshed during editing so that the effect of editing one or a number of layers is immediately apparent. The framestore image need only be refreshed in the area attached by the modification after each editing step, thus saving computer time and memory use. The refresh may be achieved by combining the colours of the layers at each affected pixel according to all control information.

The computer memory may be dynamically allocated to store any desired number of images of 24 bits each together with control images of any size and depth (e.g. different numbers of bits) of information which govern the editing of the main images. The editing may also be achieved in response to input information other than a component image, for example by applying a smoothing filter operation to the discontinuities in a component image to achieve a blurring effect.

The amount of memory allocated to store each overlay image need only be sufficient to store precisely the amount of data relating to that overlay image. The one or more overlay images may be stored in pre-multiplied form to ease the image combining calculation. The values of the pre-multiplied form may be stored as single 32 bit long words in random access memory.

The editing may affect simultaneously the colour and alpha values for each affected pixel. Overlay images may be of any size (smaller equal to or larger than the framestore) and can be positioned at any offset to the framestore. The editing step may affect any number of layers simultaneously.

The edited value at any pixel in any layer may be a function of the values of any pixel within any other layer and of any other input information.

A mask (defined as a fixed colour image whose RGB values are fixed but whose alpha value varies between pixels) may be displayed over an image by displaying at each pixel a combination between the image colour and the mask colour, the weighting of the combination being governed by the mask value at that pixel. Alternatively, the alpha values may be fixed and the RGB values can vary.

The use of a palette knife moving through layers of paint can be simulated by applying editing functions to images on successive layers whereby editing by blending colours in neighbouring layers takes into account these colours in neighbouring layers and the direction of movement of a stylus representing the knife so as to simulate movement of paint from one depth to another by the palette knife, and also the pressure applied to the stylus which pressure is used to affect the number of layers to be edited and the nature of the blending.

A limited depth of focus effect can be achieved by maintaining one image unchanged as if it were in sharp focus and to apply a blurring process of increasing intensity to images on layers of increasing distance from the main image.

When cartoon images are being generated in which a part of an image is successively displaced between images, the previous few images can be combined to show the previous few positions of a component allowing the next image to be edited in order to show a corresponding displacement of the image component in the present image in order that on successive display of the component images, a steady movement of the image component will be shown.

The various optional features may be used independently of the definition of where the invention resides set out above.

BRIEF DESCRIPTION OF THE DRAWING

A specific embodiment of the invention will now be described by way of example with reference to the accompanying drawings in which.

DETAILED DESCRIPTION OF THE PREFERRED EMBODIMENTS

Figure 1:
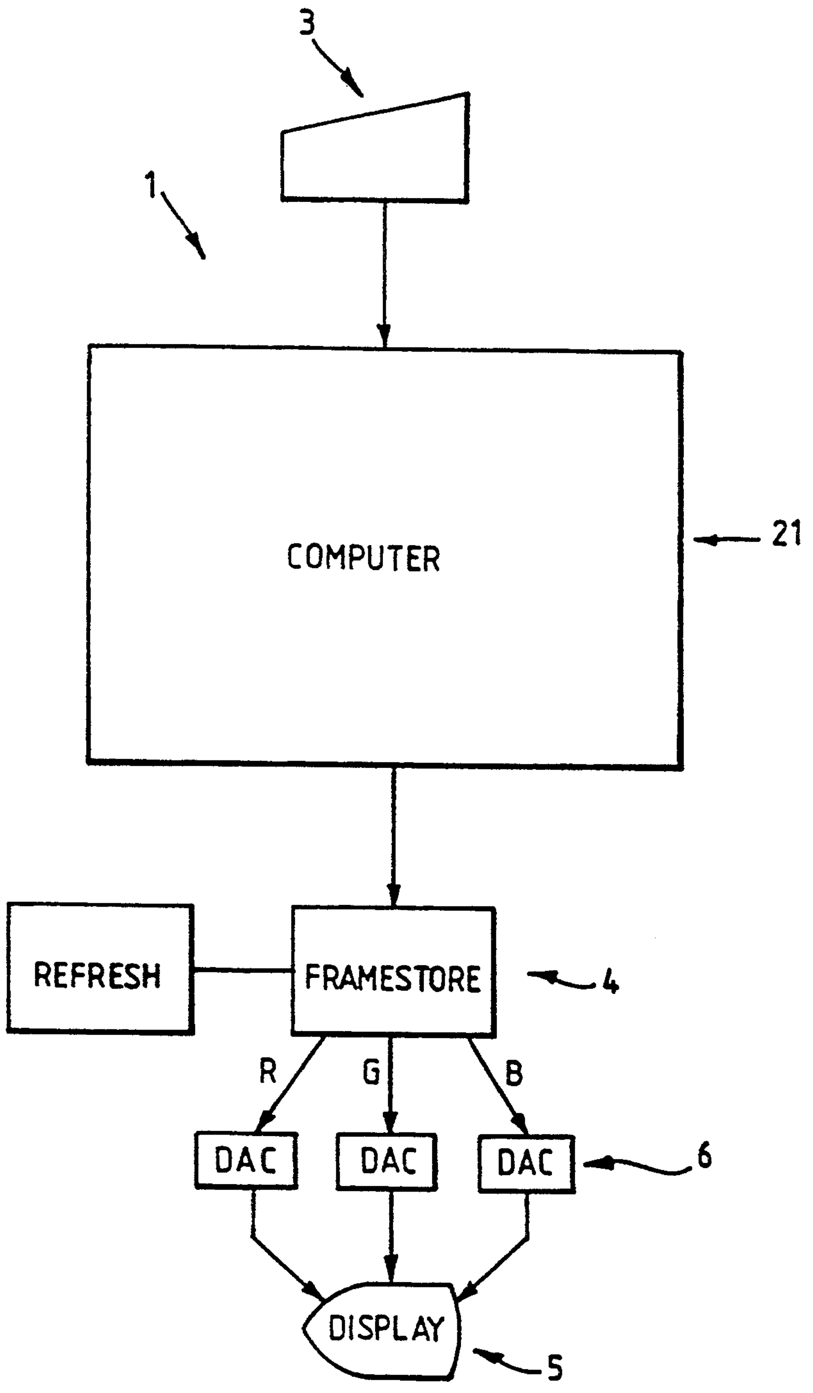
FIG. 1 represents apparatus which can be operated in accordance with the invention.
Figure 2:
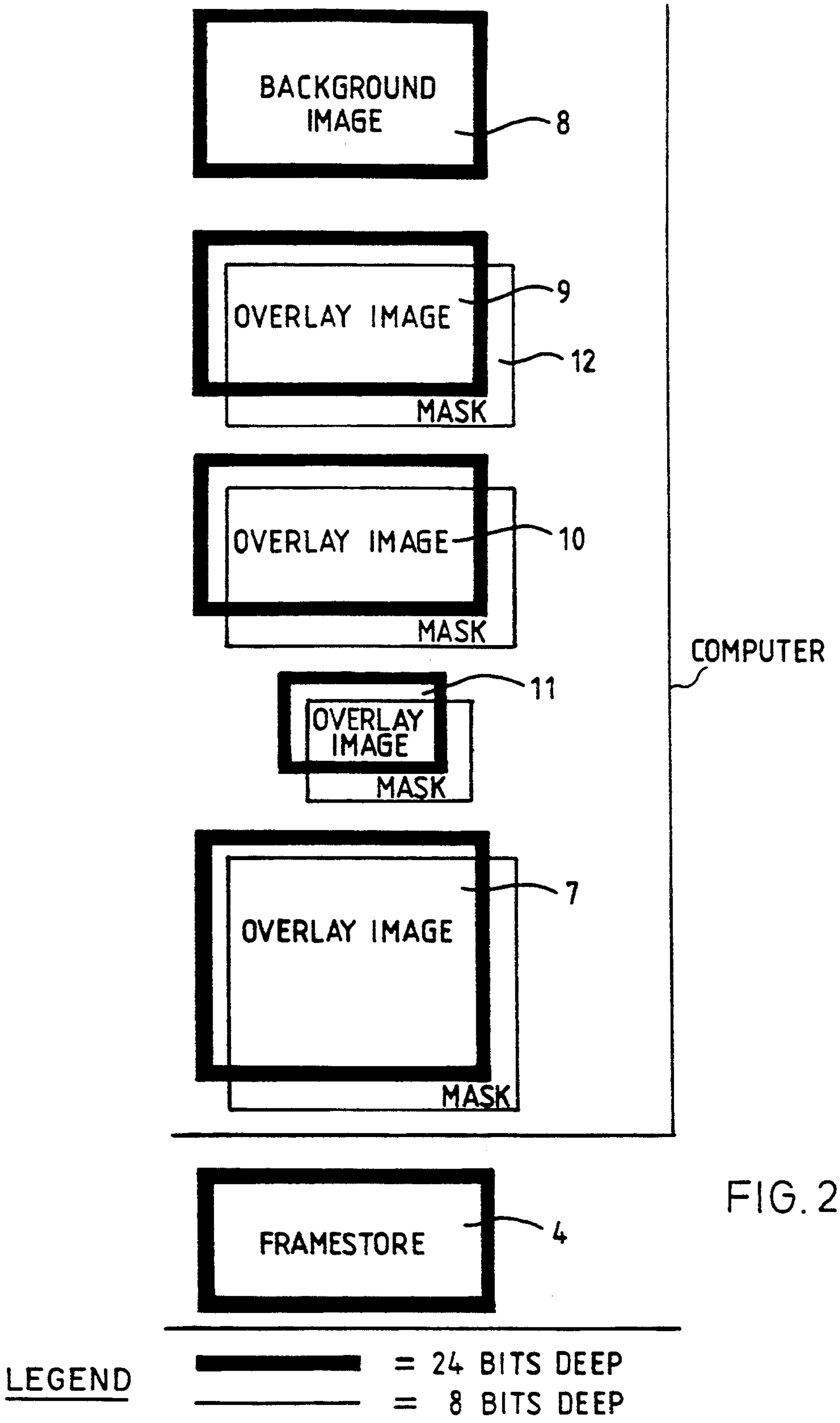
FIGS. 2, 3, 4 and 5 represent methods of processing a video image formed by more than one layer in accordance with the invention.

FIG. 1 shows apparatus 1 comprising a computer 2 having a single framestore 4, a co-ordinate data input device 3 and a display device 5 which receives the video signals from the framestore 4 after they have been converted from digital to analogue form by the digital to analogue converter (DAC) 6. A video image 7 composed of a coloured 24-bit background layer 8 is edited to assimilate additional overlay layers 9, 10 and 11 and the edited video image 7 is supplied to a single framestore 4. FIG. 2 represents the background image and four overlay images, each with their mask, stored in the computer memory. The overlay images are different sizes and do not necessarily have any part of their boundaries coincident. For example, the third overlay image is located entirely within the other images. The single framestore is separate from the computer and is only used when the composite image has been formed from the images stored in the computer.

The first overlay image 9 is stored in pre-multiplied form to ease the image combining calculation (and any further such overlay images can be stored in the same form). If the alpha value is a and the colour component value Red, Green and Blue of each pixel is represented by an 8 bit number between 0 and 255, the normal combining calculation would be:

$$\text{combined } R=(a\times R+(255-a)\times\text{background } R)/255$$

$$\text{combined } G=(a\times G+(255-a)\times\text{background } G)/255$$

$$\text{combined } B=(a\times B+(255-a)\times\text{background } B)/255$$

If alternatively we store the pre-multiplied values:

$$R'G'B'a'=(R\times a)/255,\ (G\times a)/255,\ (B\times a)/255,\ (255-a),$$

the combining calculation is reduced to $$\text{combined } R=R'+(a'\times\text{background } R)/255$$

$$\text{combined } G=G'+(a'\times\text{background } G)/255$$

$$\text{combined } B=B'+(a'\times\text{background } B)/255$$

The values stored in this way can be efficiently stored as single 32 bit long words in standard computer RAM and do not necessitate separate framestores for the colour and mask information. Each additional image layer 10 and 11 is stored in a similar 32-bit structure. There is no limit to the number of such additional overlays which may be stored, other than the total amount of RAM or other storage present in the system.

Image layers 8 and 9 can be combined in a number of ways. The system provides for 3 different types of overlay:

i) 32 bit RGBa overlay where the alpha value governs the extent to which the overlay colour replaces the background colour:

$$\text{combined } R=(a\times R+(255-a)\times\text{background } R)/255$$

$$\text{combined } G=(a\times G+(255-a)\times\text{background } G)/255$$

$$\text{combined } B=(a\times B+(255-a)\times\text{background } B)/255$$

where R,G,B,a, background R, background G and background B vary from pixel to pixel. The premultiplied form described above would alternatively be used.

Figure 3:
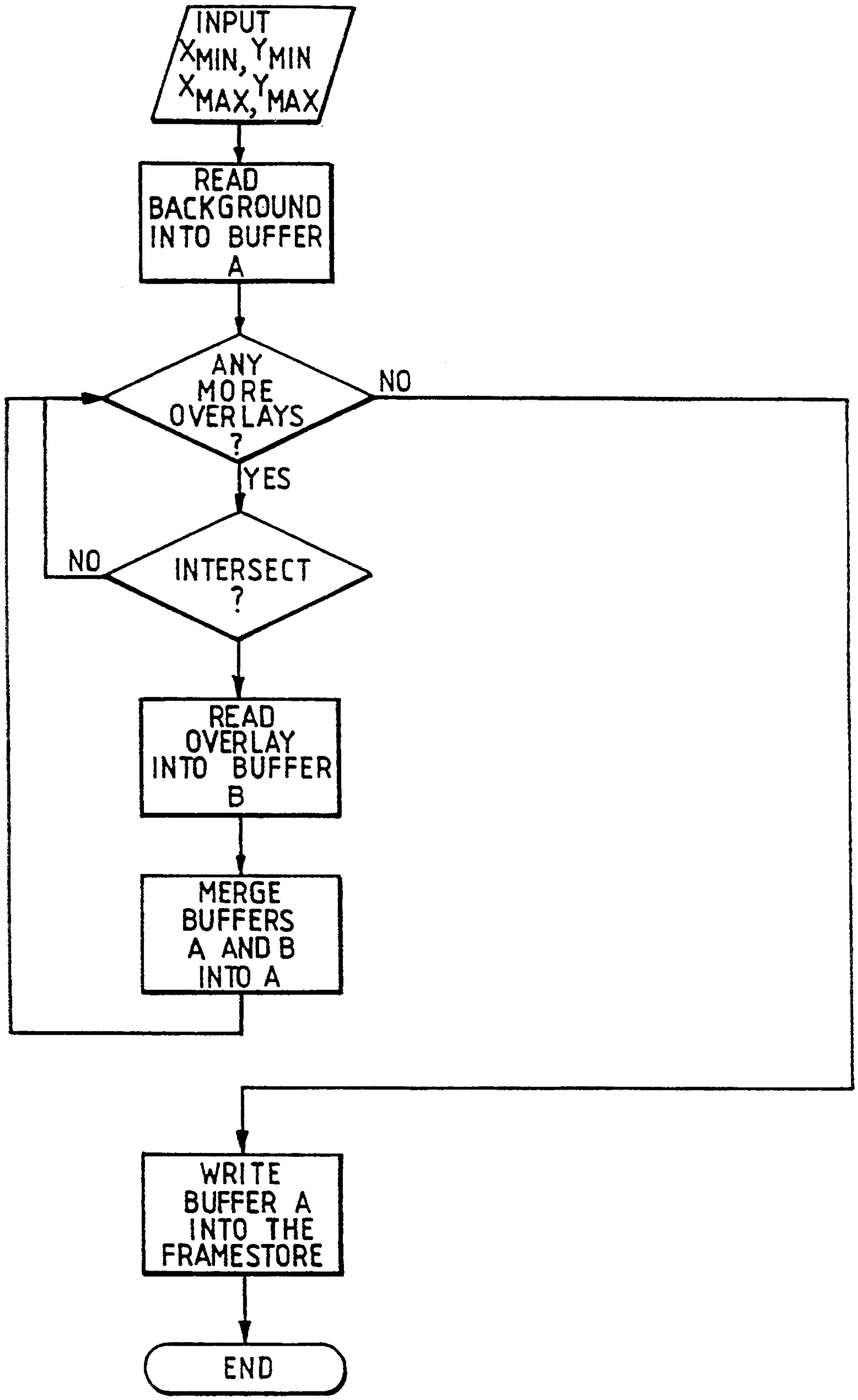
Figure 4:
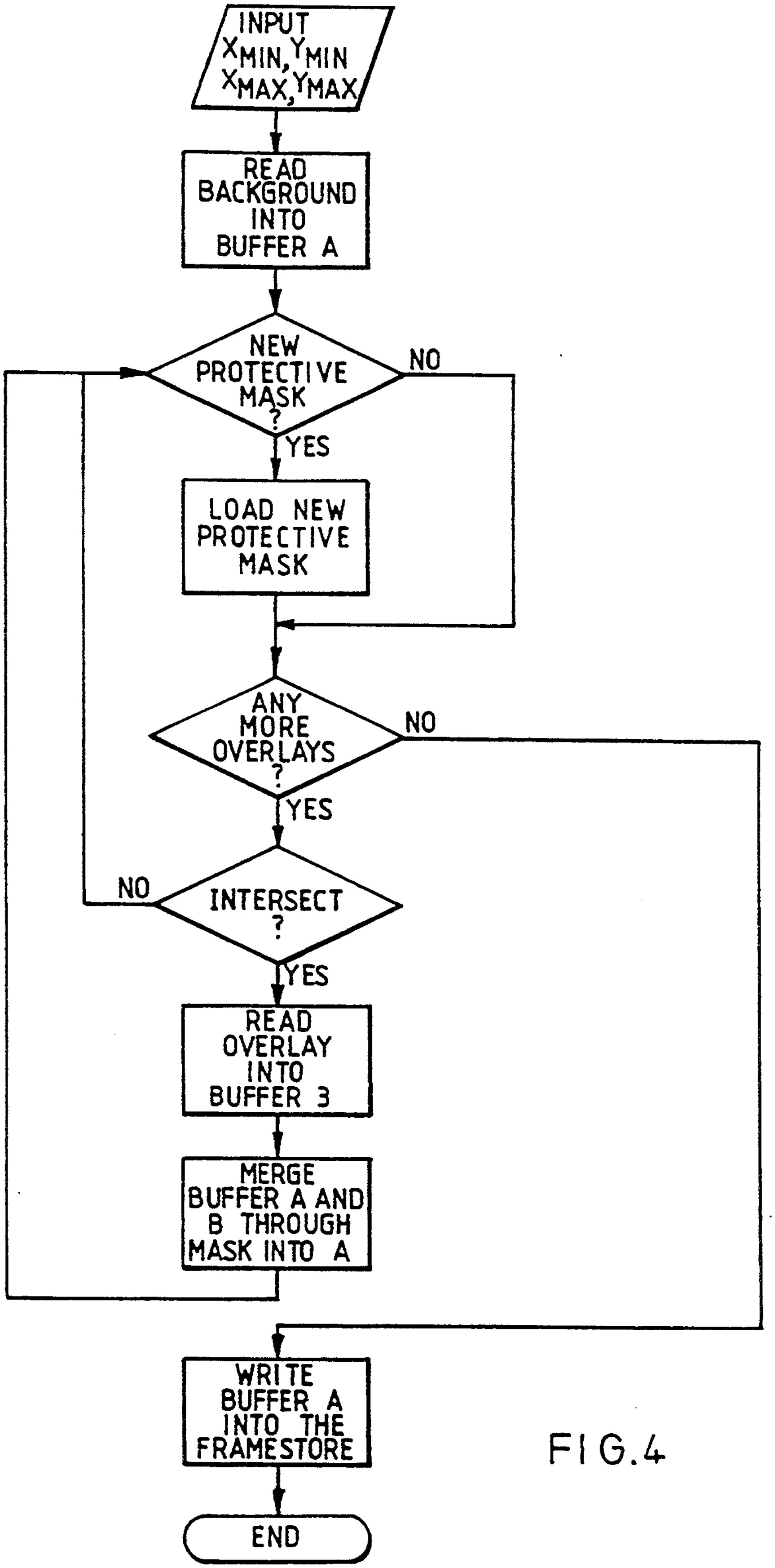
Figure 5:
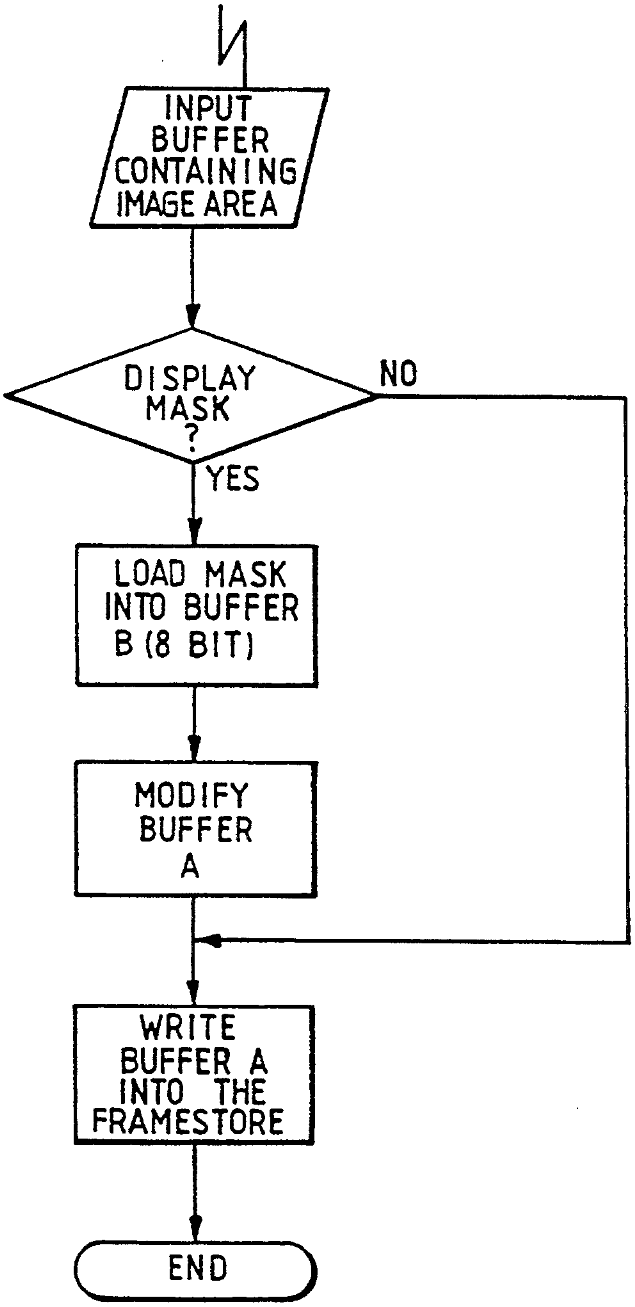

A flow chart showing a processing method in accordance with the invention and using the above calculation to merge a background image 8 and an overlay image 9 to form a combined image is shown in FIG. 3 of the drawings. FIG. 4 shows a variation using one or more protective masks.

ii) An overlay of uniform opacity is to be combined with the background image:

$$\text{combined } R=(a\times R+(255-a)\times\text{background } R)/255$$

$$\text{combined } G=(a\times G+(255-a)\times\text{background } G)/255$$

$$\text{combined } B=(a\times B+(255-a)\times \text{background } B)/255$$

where a is fixed from pixel to pixel. This is used in the cartoon image system mentioned above.

iii) 8 bit alpha overlay where the alpha value governs the extent to which the background colour is replaced by a constant solid colour R,G,B:

$$\text{combined } R=(a\times R+(255-a)\times \text{background } R)/255$$

$$\text{combined } G=(a\times G+(255-a)\times \text{background } G)/255$$

$$\text{combined } B=(a\times B+(255-a)\times \text{background } B)/255$$

where R,G,B is fixed from pixel to pixel and a varies. FIG. 5 shows a processing method in accordance with the invention which uses the above calculation iii to merge an image and a mask to form an image for display. This is the 'display mask' system.

Any of the calculation processes described above can be executed more quickly by storing a pre-multiplied look-up table of colour values.

In any of these cases, if the background 8 is to be protected by an 8 bit protective mask m, varying from pixel to pixel, the a value at each pixel in the above formulae is replaced by the value $((a\times(255-m))/255$. When $m=255$, the background 8 is completely protected (and cannot be changed), when $m=0$, the background is unprotected. Several masks may be applied.

Figure 6:
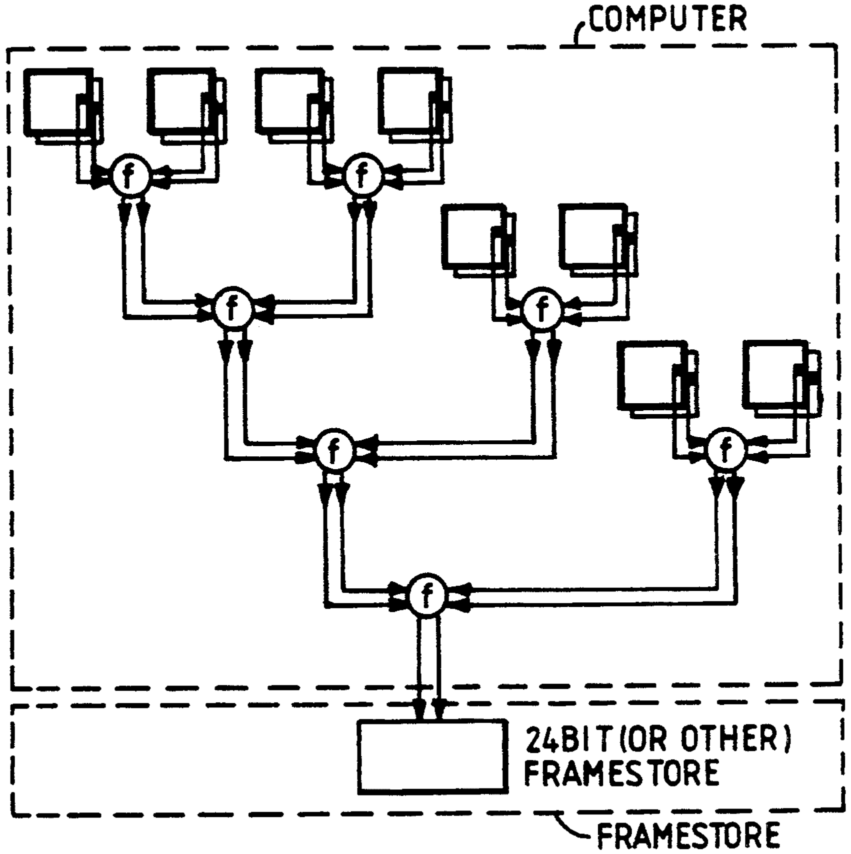
FIG. 6 represents a method of repeated combination of pairs of images in a computer before transfer to a framestore.

Multiple layers 10 and 11 can be overlayed by repeating this process, using the result of the combination as the background image to which the next overlay image can be applied. FIG. 6 shows an arrangement for combining multiple images according to combining functions f. The function f combines the contents of one or a pair of stores comprising an RGB element and/or a mask element. The function f can be different at different positions in FIG. 6. In the illustrated example there are 24 bits of RGB and 8 bits of mask, but different functions could take different numbers of bits per component. The combining function generally processes the information in the stores one pixel at a time, but it is possible for it to process several pixels from a source image to produce a single pixel of output. This can produce the effect of 'zooming out' from the image and will allow the user to view and edit an image which is bigger than the computer's framestore. The function can produce several pixels of output for a single pixel of input, producing the effect of 'zooming in' and allowing the user to see and edit a greater area of image. The function can introduce an offset between any of the input pixels to allow the user to view one image offset from another. The user can be provided with a series of on-screen tools which will allow the construction of a display of an arbitrary complexity, allowing any number of layers of images, of any depth to contribute to the final display by combinations of these functions.

It is possible to edit a pixel by bringing to it the RGB data from another pixel in the same layer or in another layer, and either to maintain the original alpha value of that pixel or to substitute the alpha value of the other pixel or even to impose a new alpha value which is a function of the two. If any pixel in the 32 bit overlay is to be replaced by a new 32 bit 'colour' RGBa, to an extent governed by an alpha value a', the modification is achieved by:

$$\text{new } R=(a'\times R+(255-a')\times \text{old } R)/255$$

$$\text{new } G=(a'\times G+(255-a')\times \text{old } G)/255$$

$$\text{new } B=(a'\times B+(255-a')\times \text{old } B)/255$$

$$\text{new } a=(a'\times a+(255-a')\times \text{old } a)/255$$

In general, when a new RGB at a pixel is a function of the RGBs of one or more other pixels (from the same or other layers) the new alpha value at that pixel will be a corresponding function of the alpha values of the input pixels. For example, an overlay can be filtered by replacing each pixel value with an average of neighbouring pixel values to achieve a soft focussed effect; the alpha values of the neighbouring pixels must also be averaged and placed in the current pixel.

We claim:

1. A method of operating a computer having a single framestore, a data input device and a display device responsive to the framestore, the method comprising receiving a plurality of component images and storing these component images separately within the computer memory, editing and combining the component images using a selected combining function and supplying the combined image to the framestore for display by the display device and wherein a component image comprises a fixed color image whose RGB values are fixed but whose alpha values vary between pixels, the editing step depending on said alpha value at the appropriate pixel being edited.

2. A method as claimed in claim 1 wherein the component images comprise representations of an element which appears within the image successively displaced in successive component images, the editing step comprising combining said component images to represent movement of the element.

3. A method as claimed in claim 1 wherein the editing step comprises applying a smoothing filter to discontinuities in a component image to achieve a blurring effect.

4. A method as claimed in claim 1 wherein the component images comprise representations of an element which appears within the image successively displaced in successive component images, the editing step comprising combining said component images to represent movement of the element.

5. A method as claimed in claim 1 wherein the editing step comprises applying a smoothing filter to discontinuities in a component image to achieve a blurring effect.

6. A method of operating a computer having a single framestore, a data input device and a display device responsive to the framestore, the method comprising receiving a plurality of component images and storing these component images separately within the computer memory, editing and combining the component images using a selected combining function and supplying the combined image to the framestore for display by the display device and wherein a component image comprises an image whose alpha values are fixed but whose RGB values vary between pixels, the editing step depending on said RGB value at the appropriate pixel being edited.

* * * * *